United States Patent [19]

Hall, III et al.

[11] Patent Number: 5,496,154

[45] Date of Patent: Mar. 5, 1996

[54] FAN DRIVE WITH HIGH TORQUE RELEASE

[75] Inventors: Arthur Hall, III, Cicero; Robert F. Combs, Mulberry, both of Ind.

[73] Assignee: General Motors Corporation, Detroit, Mich.

[21] Appl. No.: 228,844

[22] Filed: Apr. 18, 1994

[51] Int. Cl.$^6$ .............................. F04B 49/02; F16D 43/06
[52] U.S. Cl. .................. 417/223; 192/89.21; 192/105 B; 192/56.1
[58] Field of Search ..................... 417/223; 192/56 R, 192/70.23, 70.27, 89.21, 103 A, 106 R, 105 B

[56] References Cited

U.S. PATENT DOCUMENTS

| | | | |
|---|---|---|---|
| 2,937,730 | 5/1960 | Quenneville | 192/105 B |
| 3,184,025 | 5/1965 | Aschauer | 192/105 B |
| 3,536,173 | 10/1970 | Merkert | 192/103 A |
| 3,724,620 | 4/1973 | Benson, Jr. | 192/89.21 |
| 3,762,519 | 10/1973 | Bentley | 192/105 B |
| 3,952,843 | 4/1976 | Campbell et al. | 192/70.23 |
| 4,117,919 | 10/1978 | Rupp et al. | 192/70.23 |
| 4,141,439 | 2/1979 | Lunde et al. | 192/89.21 |
| 4,220,230 | 9/1980 | Hansen | 192/56 R |
| 4,538,715 | 9/1985 | Konrad et al. | 192/89.21 |
| 4,967,886 | 11/1990 | Tysver et al. | 192/89.21 |

FOREIGN PATENT DOCUMENTS

1195084  11/1985  U.S.S.R. .............. 192/103 A

*Primary Examiner*—Richard A. Bertsch
*Assistant Examiner*—Peter G. Korytnyk
*Attorney, Agent, or Firm*—Donald F. Scherer

[57] ABSTRACT

A fan drive with high torque release embodying the concepts of the present invention is adapted to disengage the fan drive under high torque conditions. The fan drive includes an input shaft member and an output shaft member. A torque transfer device operatively connects the input shaft member with the output shaft member. A spring apply mechanism is provided for engaging the torque transfer device at low speeds and under low torque loading, and a centrifugal apply mechanism is provided for maintaining engagement of the torque transfer device under higher operating speeds and at properly anticipated torque loading. A release mechanism substantially disengages the torque transfer device upon the application of higher than desired torque loading conditions.

15 Claims, 9 Drawing Sheets

FAN DRIVE WITH HIGH TORQUE RELEASE

TECHNICAL FIELD

The present invention relates generally to a fan drive. More particularly, the present invention relates to a fan drive that is driven through a torque transfer device which is selectively engageable and disengageable. Specifically, the present invention relates to a fan drive wherein the torque transfer device is automatically disengageable under a load that exceeds a preset fan torque versus fan speed relationship.

BACKGROUND OF THE INVENTION

It has previously been known to use cooling fans to supply cooling air for the engines of vehicles. In certain military vehicles, particularly track-laying vehicles designed to ford rivers and streams, the engine compartment is "wet." That is, when the vehicle fords deep water the engine compartment fills with water, thereby submerging the engine and cooling fans. In this situation, if the fans were not disengaged they would attempt to pump the water at the same rate for which they were designed to pump air. Such a condition would produce a severe over-torque condition that would likely result in failure. For example, if the torque transfer device were allowed to slip under full load, all of the fan drive power would be convened to heat which would readily cause the clutch to fail. To obviate that result, prior known arrangements require that the crew take some affirmative steps to disconnect the fans before the engine compartment is flooded.

SUMMARY OF THE INVENTION

It is therefore a primary object of the present invention to provide a novel fan drive that will automatically disengage in response to a high torque loading.

It is another object of the present invention to provide a fan drive, as above, that uses a spring apply mechanism to apply a torque transfer device at low speeds and low torque conditions.

It is a further object of the present invention to provide a fan drive, as above, that incorporates a centrifugal-apply mechanism to supplement the spring apply mechanism and increase the torque transfer capacity of the torque transfer device in proportion to the higher operating speeds.

It is another object of the present invention to provide a fan drive, as above, that incorporates a torque release mechanism to reduce the torque transfer capacity of the torque transfer device in proportion to any higher than properly anticipated torque conditions.

It is still another object of the present invention to provide a fan drive, as above, that will automatically accomplish the foregoing objects without the need for external controls or for independent action by the vehicle operator.

It is yet another object of the present invention to provide a fan drive, as above, that may be readily adapted to incorporate a hydraulically operated manual disconnect.

These and other objects of the invention, as well as the advantages thereof over existing and prior art forms, which will be apparent in view of the following derailed specification, are accomplished by means hereinafter described and claimed.

In general, a fan drive with high torque release embodying the concepts of the present invention utilizes an input shaft member and an output shaft member. A torque transfer device operatively connects the input shaft member with the output shaft member. A spring apply mechanism is provided for engaging the torque transfer device at low rotational speeds and under low torque loading conditions. A centrifugal-apply mechanism is also provided for maintaining engagement of the torque transfer device at higher speeds and normal torque loading conditions. A release mechanism is provided for releasing the torque transfer device under the application of higher than desired torque loads.

To acquaint persons skilled in the arts most closely related to the present invention, one preferred embodiment of a fan drive that illustrates a best mode now contemplated for putting the invention into practice—and one variation thereof—are described herein by, and with reference to, the annexed drawings that form a part of the specification. The exemplary fan drive is described in detail without attempting to show all of the various forms and modifications in which the invention might be embodied. As such, the embodiments shown and described herein are illustrative and, as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

One representative form of a fan drive embodying the concepts of the present invention is designated generally by the numeral 10 on the accompanying drawings. As can best be seen in FIG. 1, the representative fan drive 10 may be contained within a two-piece housing 11, the opposed portions $11_A$ and $11_B$ of which may be demountably secured together as by fasteners in the nature of machine bolts 12. An input shaft member 13 may be rotatably supported in a bearing 14A that is received within a bearing box 15A provided in portion $11_A$ of the housing 11.

As previewed in the preceding paragraph, closely related but different structural members, components or arrangements will generally be identified by a common numerical designation applied to the member, component or arrangement, but the variations shall be identified by a letter subscript used in combination with the common numerical designation. Thus, the housing is generally identified by the number 11, but the two similar, though not identical, portions thereof will be identified with the alphanumeric designation $11_A$ and $11_B$. This suffix convention shall be employed throughout the specification.

As was also previewed in the opening paragraph of the description, and as will become apparent from the description which follows, a particular structural member, component or arrangement may be employed at more than one location. When referring generally to that type of structural member, component or arrangement, a common numerical designation shall be employed. However, when one of the structural members, components, or arrangements so identified is to be individually identified, it shall be referenced by virtue of a letter suffix employed in combination with the numerical designation employed for general identification of that structural member, component or arrangement Thus, there are at least two bearings. Those bearings are generally identified by the numeral 14, but the specific, individual bearings are, therefore, identified as 14A and 14B in the specification and on the drawings. This second suffix convention shall also be employed throughout the specification.

Figure 2:
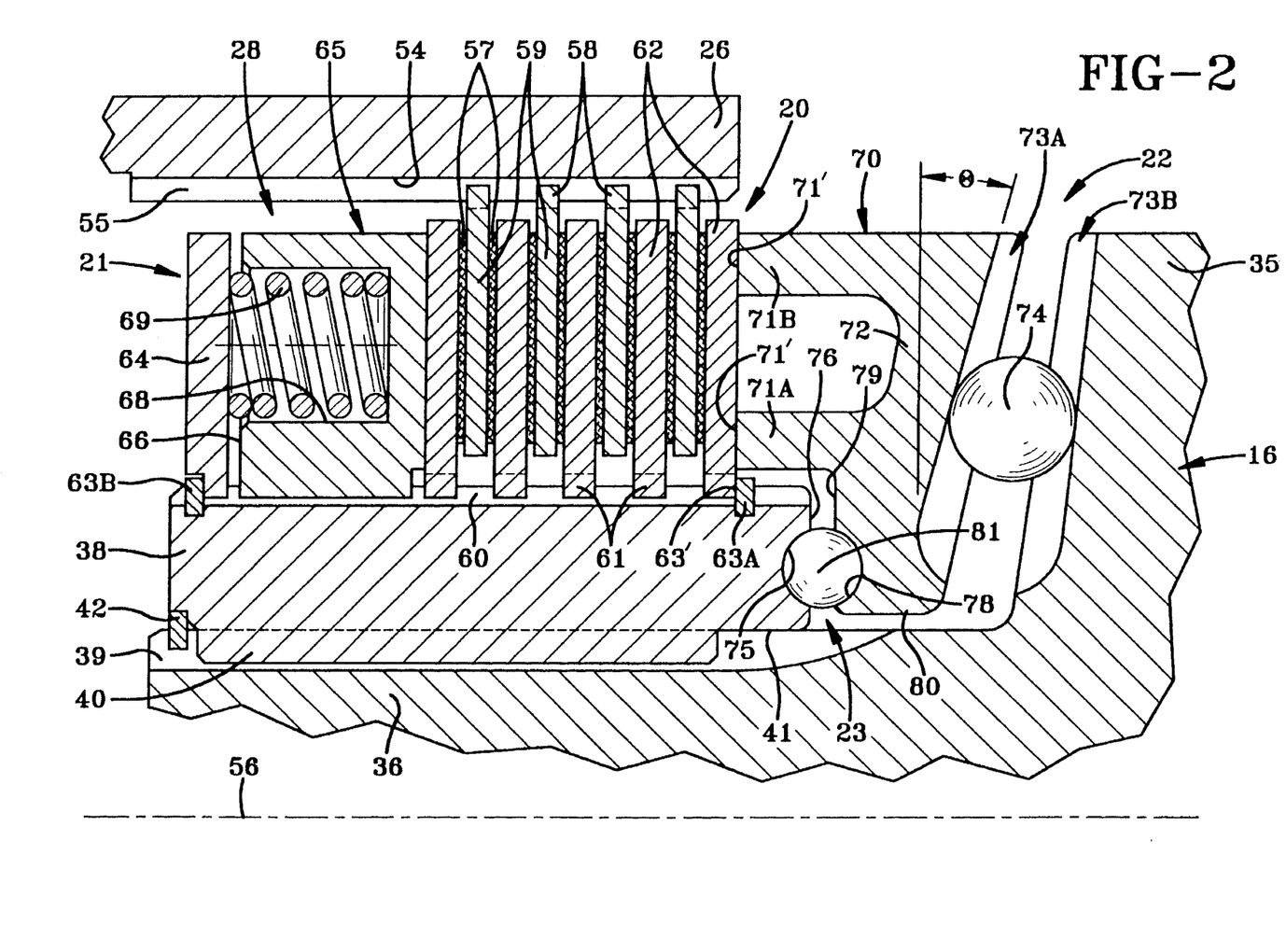
FIG. 2 is an enlarged area of FIG. 1, that area being outlined on FIG. 1 with a chain line and being designated "SEE FIG-2"

An output shaft member 16 may be similarly supported for rotation in a bearing 14B that is received within a bearing box 15B provided in portion $11_B$ of the housing 11. The output shaft member 16 rotates in response to rotation of the input shaft member 13 under predetermined operating parameters by means of a torque transfer device 20. The torque transfer device 20—as is best seen in FIG. 2—has: a generally conventional spring apply mechanism 21 that cooperates with a centrifugal apply mechanism 22; and, a torque-sensitive mechanism 23 that releases the centrifugal-apply mechanism 22 and, at least to some extent, the spring apply mechanism 21 in response to the application of a predetermined resistive torque to the output shaft member 16.

Figure 1:
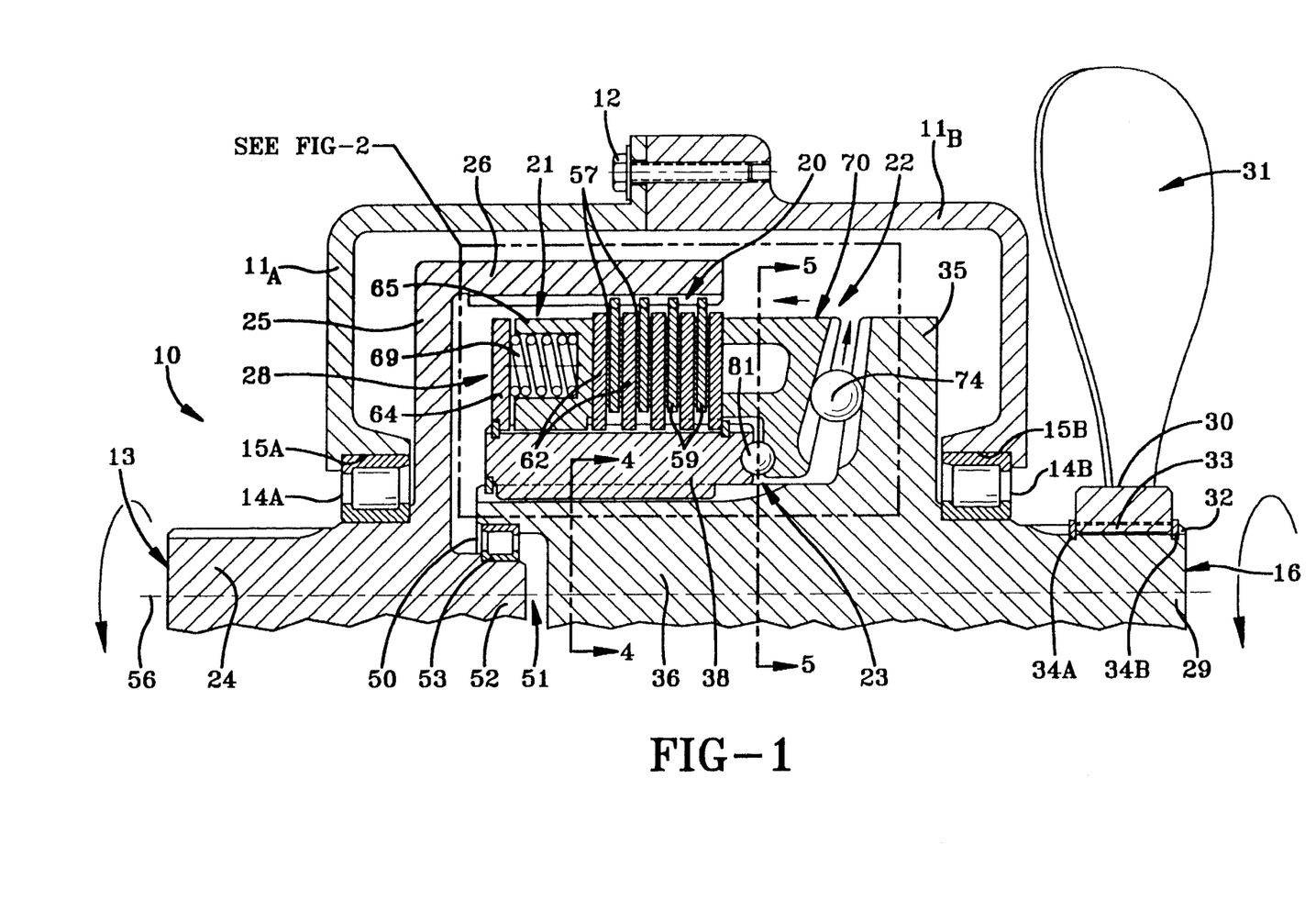
FIG. 1 is a longitudinal cross-sectional representation of a fan drive mechanism embodying the concepts of the present invention, the device being depicted in the centrifugally applied state.

As can be seen in FIG. 1, the input shaft member 13 has a splined input end portion 24 that extends outside portion $11_A$ of the housing 11. Interiorly of the housing 11, the input shaft member 13 has a radially extending generally planar offsetting flange 25 that terminates in an annular skirt portion 26. The skirt portion 26 circumscribes a generally hollow cylindrical recess 28 within which at least a portion of the torque transfer device 20 is received.

The output shaft member 16, which is journalled in portion $11_B$ of the housing 11, has a driving portion 29 that extends axially outwardly from portion $11_B$ of the housing 11 to engage the hub 30 of a fan 31. The driving connection may be effected by a plurality of splines 32 on the driving portion 29 of the output shaft member 16 which engage corresponding splines 33 on the interior of the hub 30. The hub 30 may be secured in position on the driving portion 29 by a pair of axially spaced lock rings 34A and 34B.

The output shaft member 16 is further defined by a radially extending shoulder 35 and a support portion 36 that is splined to receive a torque sensing collar 38. As best seen in FIG. 2, axially extending splines 39 on the radially outer surface of the support portion 36 are selectively engageable with axially extending splines 40 on the radially inner cylindrical surface 41 of the torque sensing collar 38. The configuration of the splines 39 and 40, as is hereinafter explained in detail, is selected to assure that the torque sensing collar 38 will be rotatable with and—but to only a modest degree—with respect to, the support portion 36 of the output shaft member 16. The axially inboard (to the left as viewed in FIG. 3) disposition of the torque sensitive collar 38 along the support portion 36 of the output shaft member 16 is secured by a snap ring 42.

Figure 4:
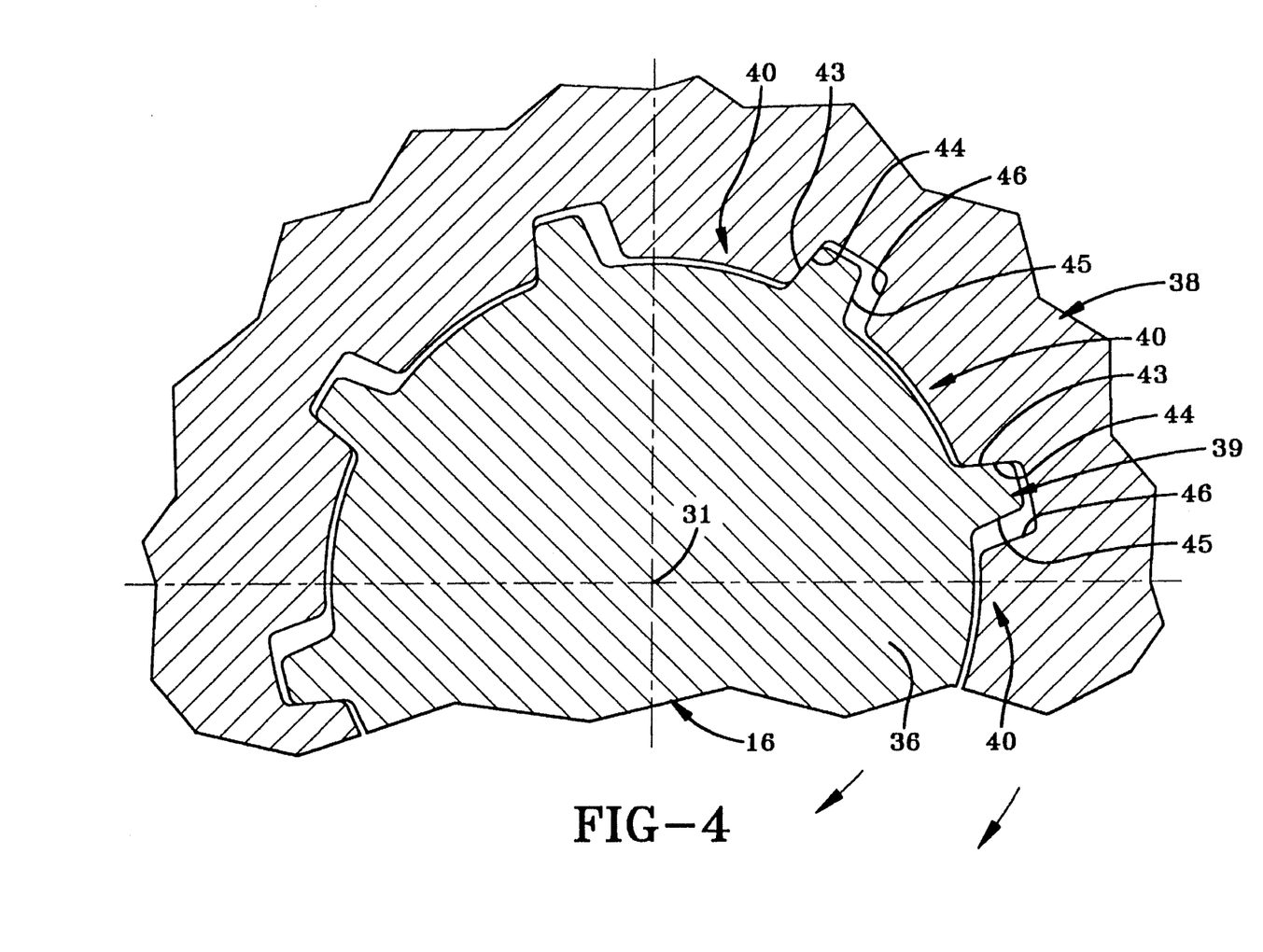
FIG. 4 is an enlarged cross section taken substantially along line 4—4 of FIB. 1.

As best depicted in FIG. 4, the circumferential spacing of the axial splines 39 on the support portion 36 of the output shaft member 16 is such that only one side of each spline 39 will engage one side of each corresponding spline 40 on the torque sensing collar 38 at a time. As such, only side 43 of each spline 39 engages side 44 of each spline 40 during normal operation of the fan 31. Conversely, only side 45 of each spline 39 will engage side 46 of each spline 40 when the fan is suddenly subjected to high torque resistance. The aforesaid ability of the splines to engage only one side at a time permits a limited amount of relative rotation between the output shaft member 16 and the torque sensing collar 38, and that relative rotation is, as will be hereinafter more fully described, critical to the release of the torque transfer device 20 in response to the application of high torque resistance to the output shaft member.

With continued reference to the output shaft member 16, as depicted in FIG. 1, the inboard end face 50 includes a cup-shaped recess 51 in which the terminal end portion 52 of the input shaft member 13 is journalled. One satisfactory means by which to journal the terminal end portion 52 of the input shaft member 13 within the recess 51 of the output shaft portion 16 is by means of a cylindrical roller bearing 53. This arrangement facilitates the required, but modest, independent rotation of the output shaft member 16 with respect to the input shaft member 13.

Turning now to the torque transfer device 20, the cylindrical interior surface 54 of the annular skirt 26—as best seen in FIG. 2—is interrupted by a plurality of axial splines 55 that extend parallel to the longitudinal axis 56 of the input and output shaft members 13 and 16. The splines 55 are engaged by a plurality of tangs 58 that extend radially outwardly from a plurality of driving torque transfer plates 59, such that the driving torque transfer plates 59 will rotate with, but not with respect to, the shaft input member 13.

With continued reference to FIG. 2, a plurality of axially extending splines 60 are provided on the outer circumference of the torque sensing collar 38 to engage a plurality of radially inwardly extending tangs 61 on the driven torque transfer plates 62. The driven torque transfer plates 62 are alternately interleaved with respect to the driving torque transfer plates 59 that are rotatable with the input shaft member 13. As is customary, an annular friction disk 57 is interposed between each successive first and second torque transfer plates 59 and 62. To assure that the several friction disks 57 will not be displaced during any phase of the operation of the torque transfer device 20, each friction disk 57 is preferably secured to one of the torque transfer plates 59 or 62 between which it is sandwiched. As is well known to the art, each friction disk 57 may be bonded to either (but not both) of the first or second torque transfer plates 59 or 62 by a suitable adhesive.

Turning now to an explanation of the spring apply mechanism 21, it will be best observed from FIG. 2 that a snap ring 63A is received within the radially outer circumference of the torque sensing collar 38 to delineate the axially outboard (to the right as viewed in FIGS. 1 and 2) extent to which the stacked torque transfer plates 59 and 62 are permitted to move. That is, the snap ring 63A presents a reaction surface 63' at the opposite or inboard end of the torque sensing collar 38, a rigid annular backing plate 64 is received about the circumference of the torque sensing collar 38, and the backing plate 64 is also secured in position on the torque sensing collar 38 by virtue of a snap ring 63B that also circumscribes the torque sensing collar 38.

A spring apply member 65 is interposed between the rigid backing plate 64 and the interleaved torque transfer plates 59 and 62. An inboard face 66 of the spring apply member 65 is preferably recessed, as at 68, to receive a plurality of compression springs 69. The biasing action of the compression springs 69 tends to drive the spring apply member 65 away from the backing plate 64 and toward the interleaved torque transfer plates 59 and 62. That is, the spring apply member 65 is continuously urged in an outboard direction by the biasing action of the spring 69. Although axially outboard displacement of the interleaved torque transfer plates 59 and 62 is limited by the location of the snap ring 63B, the outboard displacement is also limited by the location of the centrifugal apply member 70.

As shown, the centrifugal apply member 70 has radially inner and radially outer annular engaging flanges 71A and 71B, respectively, which extend axially inboard from the hereinafter more fully described generally radially extending centrifugal-apply ring portion 72 of the centrifugal apply member 70. The centrifugal apply ring portion 72 is cooperatively opposed to the shoulder 35 on the output shaft member 16. As such, the action of the compression springs 69 against the backing plate 64 drives the spring apply member 65 against the interleaved torque transfer plates 59 and 62, such that they are compressed between the spring apply member 65 and the engaging flanges 71 on the centrifugal apply member 70 if the output speed is sufficient to generate an adequate centrifugal apply force. If the speed is low (below approximately 1,000 RPM), the spring apply force drives the interleaved torque transfer plates 59 and 62 against the reaction surface 63' on snap ring 63A.

The ring portion 72 of the centrifugal apply member 70 is disposed in general opposition to the shoulder 35 on the output shaft member 16. So disposed, a plurality of circumferentially spaced generally radially extending semi-cylindrical tracks 73A are provided in the centrifugal apply ring 72 in opposition to virtually identical tracks 73B in the shoulder 35. The tracks 73A and 73B convergingly taper toward each other as they extend radially outwardly along the axially spaced centrifugal apply ring 72 and the opposed shoulder 35. Each opposed pair of tracks 73 receives a centrifugal apply ball 74 which may be displaced radially inwardly and/or outwardly along the tracks 73. In order to prevent the centrifugal apply ball 74 from binding within the tracks, the combined convergence of the opposed tracks 73 is preferably greater than approximately seven degrees (7°).

Were one simply to dispose the tracks along a radial plane and make the tracks taper at a combined angle greater than about seven degrees (7°), that convergence would suffice for the centrifugal apply ball 74 to respond effectively to centrifugal forces within the range of rotational speeds at which the input and output shaft members 13 and 16 would normally be expected to operate. However, a radial disposition would not necessarily facilitate displacement of the centrifugal apply ball 74 in response to axial displacement of the centrifugal apply member 70. That result is facilitated by inclining the tracks with respect to a radial reference, as shown at θ in FIG. 3. An inclination wherein θ is equal to approximately fifteen degrees (15°) has been found to be quite satisfactory.

Figure 3:
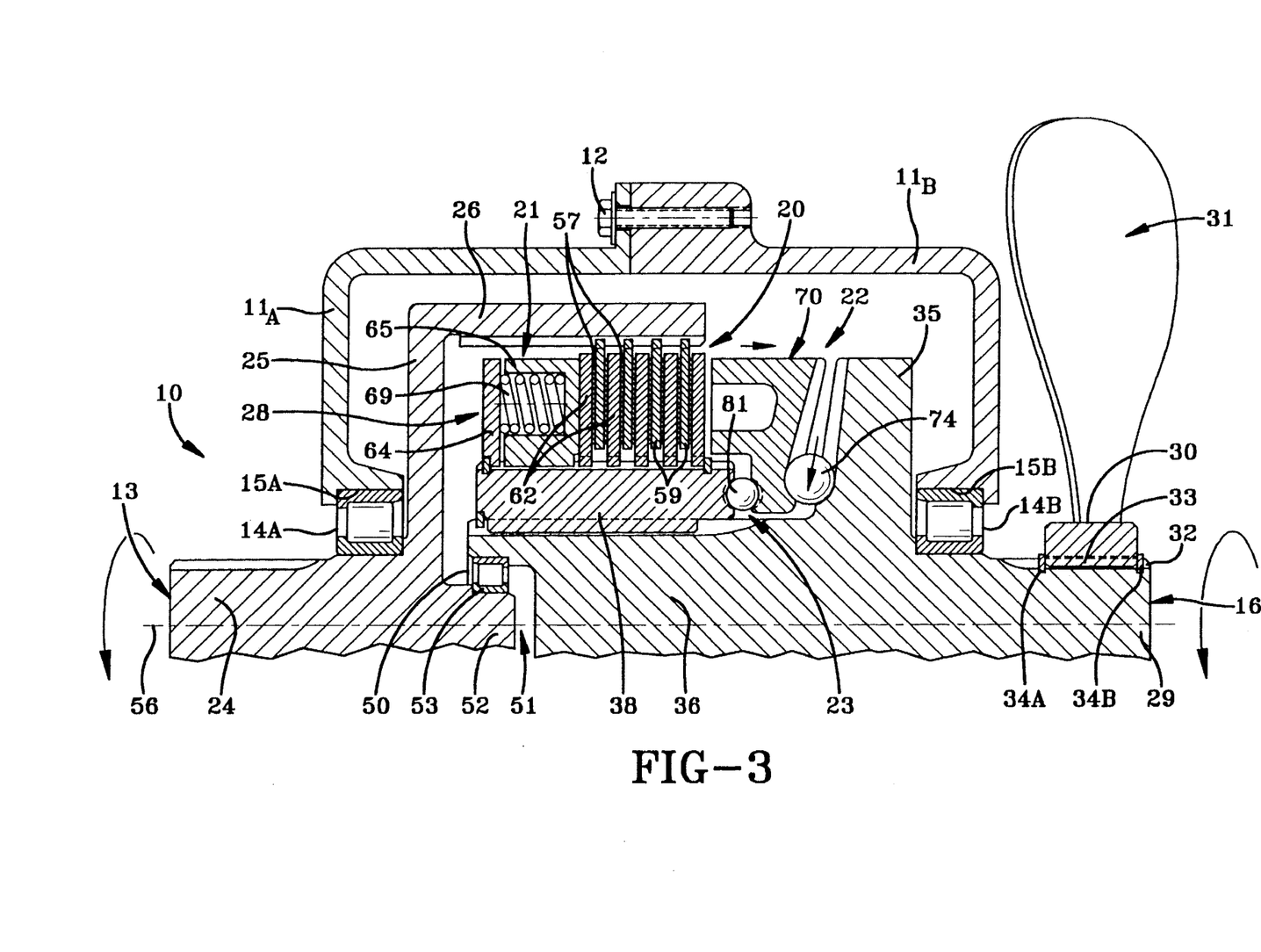
FIG. 3 is a view similar to FIG. 1, but depicting the torque transfer device as being disengaged by virtue of the release mechanism.

The convergingly tapered tracks 73 present, as will become apparent to one skilled in the art, opposed partially cylindrical surfaces having radii that will slidingly receive the spherical, centrifugal apply balls 74. When a centrifugal apply ball 74 is disposed at the radially innermost extent of an opposed pair of tracks 73, the centrifugal apply member 70 will be disposed in the closest proximity to the shoulder 35, as depicted in FIG. 3. It will be observed that when the centrifugal apply balls 74 are disposed at their radially innermost extent, the centrifugal apply member 70 is disengaged from the torque transfer device 20. Conversely, when the centrifugal apply ball 74 is disposed radially outwardly along the tracks 73, the centrifugal apply member 70 will be progressively disposed at an increasing separation with respect to the shoulder 35 and will, therefore, progressively apply greater pressure against the torque transfer device 20.

The release mechanism 23 incorporates a plurality of circumferentially extending circumferentially spaced helically tapered camming ramp recesses 75 on the outboard surface 76 of the torque sensitive collar 38. An opposed plurality of circumferentially extending circumferentially spaced helically tapered camming ramp recesses 78 are provided in the inboard surface 79 on the radially inwardly extending base portion 80 of the centrifugal apply ring 72. The camming ramp recesses 75 and 78 are circumferentially offset and oppositely tapered. Nevertheless, a cam ball 81 is received between each opposed set of camming ramp recesses 75 and 78.

Figure 5:
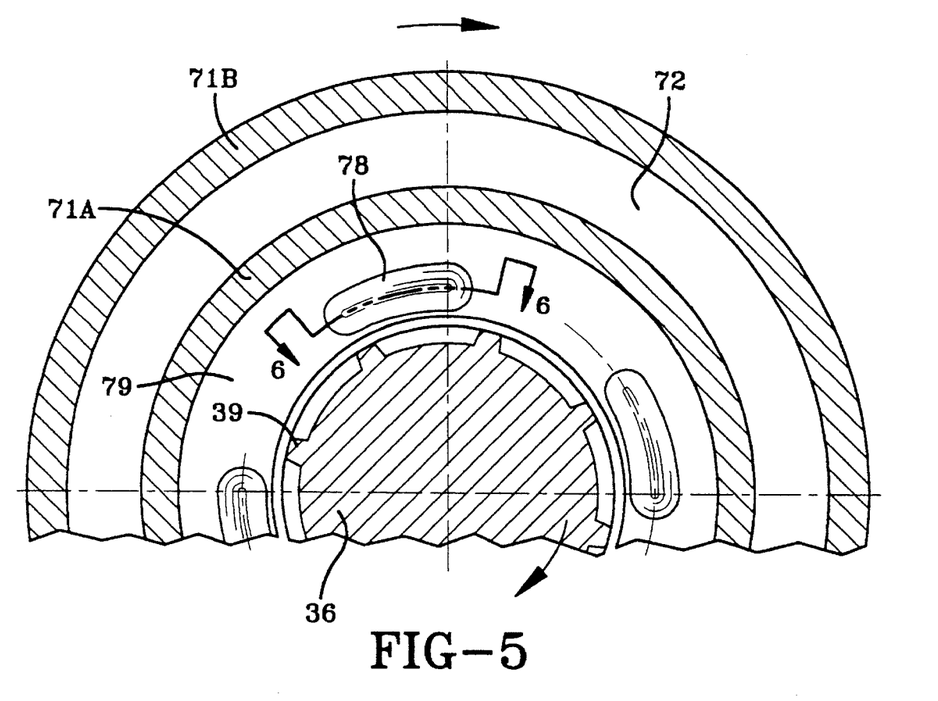
FIG. 5 is an enlarged cross section taken substantially along line 5—5 of FIG. 1 to present a portion of the release mechanism in elevation.
Figure 6:
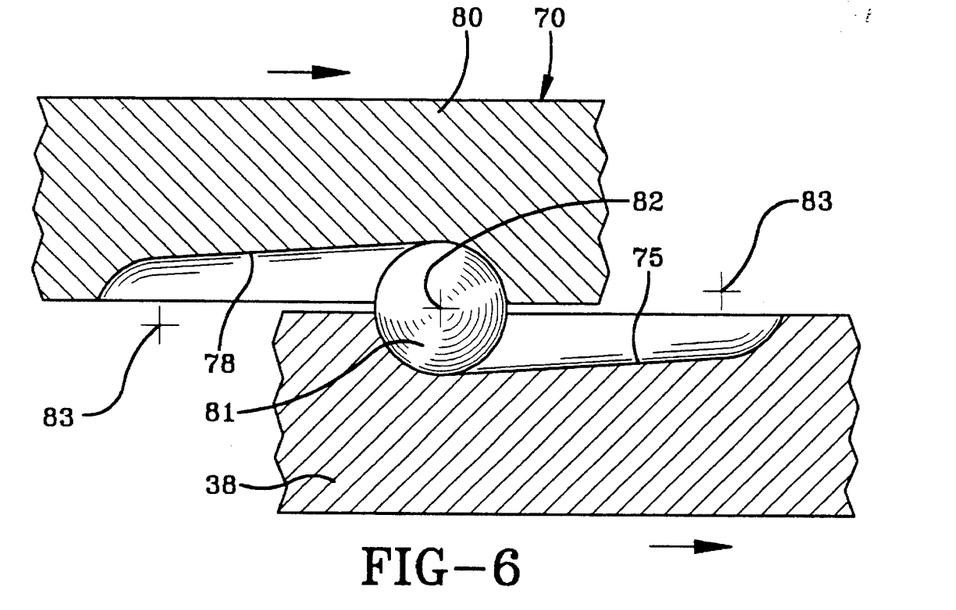
FIG. 6 is a further enlarged cross section taken substantially along line 6—6 of FIG. 5 to depict the opposed camming ramp recesses and their relative disposition when disposed to react in response to the cam ball received in cooperative interengagement with opposed pairs of the camming ramp recesses.
Figure 6A:
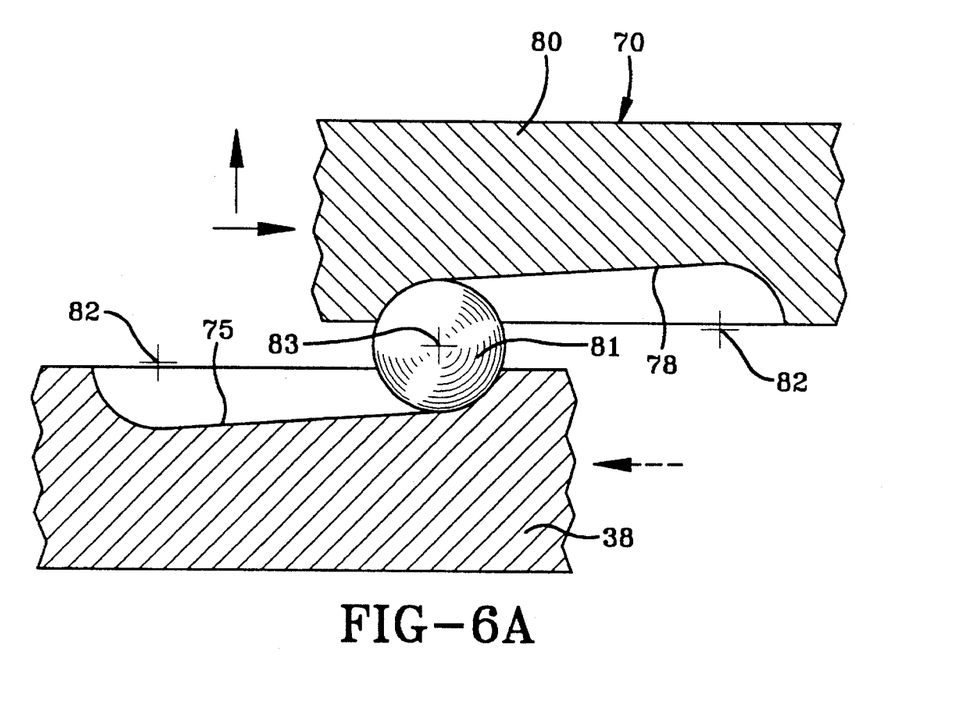
FIG. 6A is a view similar to FIG. 6, but depicting the opposed camming ramp recesses and their relative disposition after having responded to the cam balls in response to a high torque application.

An elevational sight picture of the camming ramp recesses 78 is best seen in FIG. 5, and a cross section which reveals the helical—i.e.: axially extending—taper of the opposed camming ramp recesses (and their relative circumferential disposition) is best seen in FIGS. 6 and 6A. It will be observed that, as shown, the camming ramp recesses 78 taper axially inboard in a counterclockwise direction (as viewed in FIG. 5). The opposed camming ramp recesses 75 in the centrifugal apply member 70 are reversely disposed and circumferentially offset. That is, with the fan operating normally, the components are all rotating in the direction of the arrows in FIGS. 1, 5 and 6. In that operating condition, the sides 44 on the splines 40 engage sides 43 on splines 44, such that the output shaft member 16 will rotate with the input shaft member 13, and the cam members—i.e.: the cam balls 81—are disposed within the deepest end of each opposed camming ramp recess 75 and 78. Thus, under normal operating conditions, the center of each cam ball would be located at a point 82, as depicted in FIG. 6.

Before proceeding with an explanation as to the operation of the torque sensitive release mechanism 23, one must fully understand the operation of both the spring apply mechanism 21 and the centrifugal apply mechanism 22.

In operation at low speeds (below 1,000 RPM), the spring apply mechanism 21 supplies a sufficient apply force to compress the interleaved torque transfer plates 59 and 62 and the interposed friction disks 57 against the reaction surface 63' on snap ring 63A. However, as the input and the output shaft members 13 and 16 exceed approximately 1,000 RPM, the centrifugal apply balls 74 are moved radially outwardly along tracks 73 to position the centrifugal apply member 70, such that the reaction surfaces 71' on the engaging flanges 71 will be positioned to be engaged by the interleaved torque transfer plates 59 and 62, thus increasing the compression of the interleaved torque plates 59 and 62 as the centrifugal apply member 70 is displaced toward the spring apply mechanism 21. As such, the output shaft member 16 drives the fan 31 in response to rotation of the input shaft member 13 throughout its full range of rotation.

Figure 7:
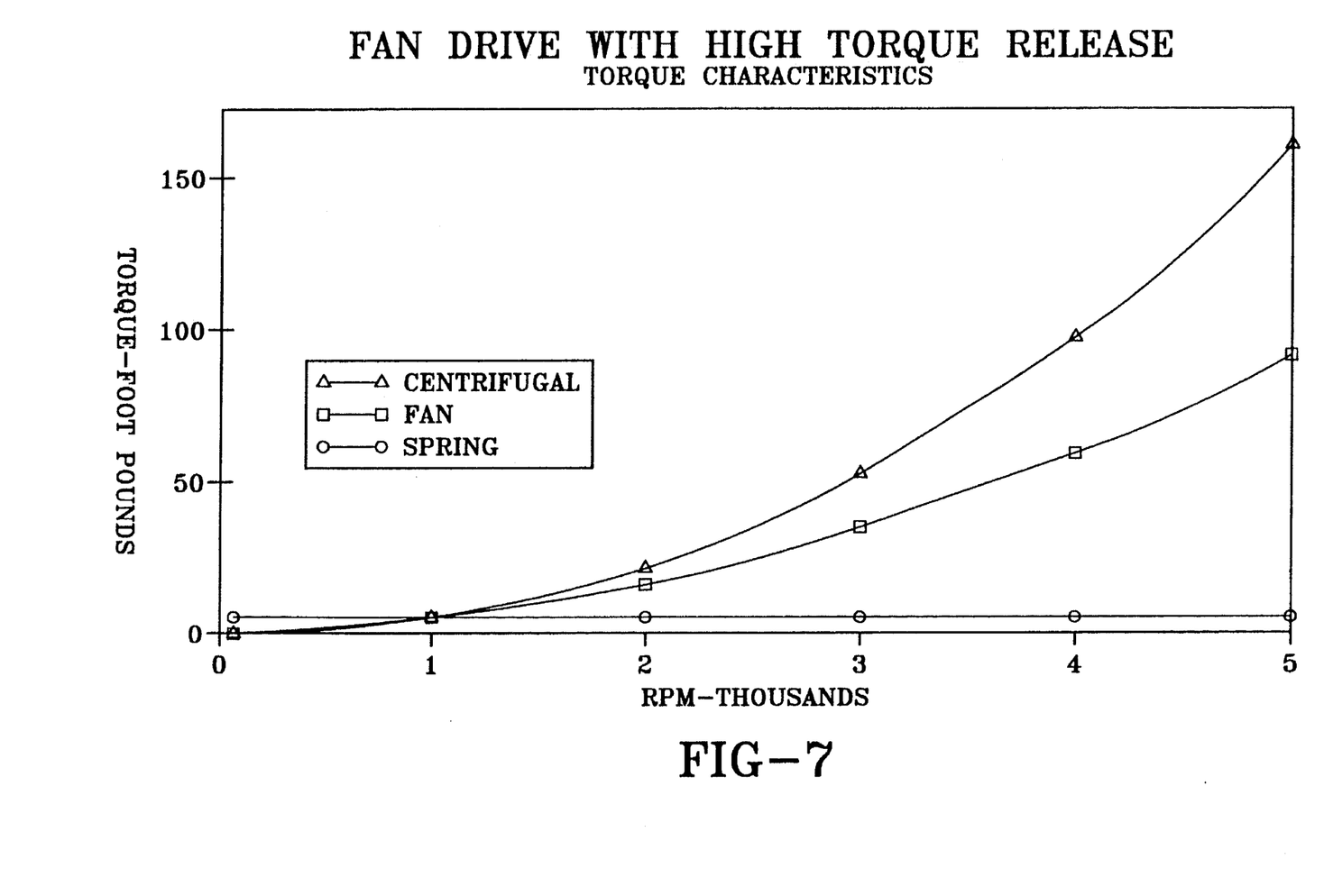
FIG. 7 is a graph which depicts the application of torque through the torque transfer device as a result of the spring apply mechanism and the centrifugal-apply mechanism, both shown in relation to the torque required to operate the fan across the full range of rotational speeds at which it is intended to operate.

With reference to the graph of FIG. 7, it can be seen that as the speed of the input shaft member 13 increases, the torque required to drive the fan 31 also increases. The curve labeled "fan" represents the torque required to drive the fan 31, while the curve labeled "spring" represents the torque capacity of the torque transfer device resulting from the compression of the interleaved torque transfer plates 59 and 62 solely by virtue of the spring apply mechanism 21. Because the spring apply force does not change with increasing speed, it is shown as a straight horizontal line. It should be noted that the "spring" torque exceeds the "fan" torque at speeds below 1,000 RPM. Thus, the spring apply system drives the fan at speeds below 1,000 RPM.

However, as the speed of the rotating input and output shaft members 13 and 16 jointly approaches 1,000 RPM, the centrifugal force acting on the centrifugal apply balls 74 causes them to move radially outward along the opposed tapered tracks 73. Because of the radial outward convergence of the tapered tracks 73, radial displacement of the centrifugal apply balls 74 forces the centrifugal apply member 70 to be translated axially inboard relative to the axially fixed shoulder 35 on the output shaft member 16. The axial displacement of the centrifugal apply member 70 causes the interleaved torque transfer plates 59 and 62 to be further compressed between the spring apply member 65 and the centrifugal apply member 70.

Thus, as the centrifugal force acting on the balls 74 increases due to increased rotational speed of the drive 10, the compressive force exerted on the interleaved torque transfer plates 59 and 62 also increases. With continued reference to the graph of FIG. 5, the curve labeled "centrifugal" shows the torque capacity resulting from the centrifugal apply force minus the opposing fan torque force. It should be noted that the net torque capacity of the centrifugal apply mechanism 22 does not exceed the torque capacity of the spring apply mechanism 21 until the spring apply member 65 bottoms out against the backing plate 64. This occurs at about 1,000 RPM when the centrifugal apply force begins to exceed the spring apply force.

The spring apply mechanism 21 is required to initiate operation of the torque transfer device 20—and thus initiate rotation of the fan 31— during rotation of the input shaft member 13 up to approximately 1,000 RPM. At speeds over 1,000 RPM, the centrifugal apply mechanism 22 generates sufficient apply force to engage the torque transfer device 20.

When the fan 31 is subjected to a torque loading, such as would occur if the fan were submerged in water, or if a foreign object were to preclude rotation of the fan 31, a relative rotational difference is induced between the input shaft member 13 and the output shaft member 16. This relative rotation is accommodated by the relative rotation permitted between the splines 39 and 40 which effect the rotational drive connection between the output shaft member 16 and the torque sensing collar 38. That is, under the application of a high torque resistance to rotation of the fan 31, the output shaft member 16 suddenly slows to bring side 45 on each spline 39 into engagement with the side 46 of the corresponding splines 40. This "reverse" rotation of the torque sensing collar 38 (as represented by the arrow having the dashed line shaft in FIG. 6A) effects a momentary corresponding relative rotation between the camming ramp recesses 75 and 78 to move the cam balls 81 previously centered at point 82 (FIG. 6) to point 83 (FIG. 6A). The cam balls 81 thus drive the centrifugal apply member 70 against the centrifugal apply balls 74, forcing them to move radially inwardly along tracks 73 to disengage the centrifugal apply member 70 from the interleaved torque transfer plates 59 and 62 of the torque transfer device 20.

FIG. 4 depicts the means by which relative rotation between the output shaft member 16 and the torque transfer collar 38 is accommodated. FIGS. 6 and 6A depict the circumferential displacement of the cam balls 81 and the resulting axial displacement of the centrifugal apply member 70 relative to the torque sensing collar 38 (as represented by the vertically oriented arrow with the solid line shaft in FIG. 6A).

It will be apparent that only a very limited amount of relative rotation of the splines 39 on the output shaft member 16 with respect to the splines 40 on the torque sensing collar 38 is required for the cam balls 81 to operate in the opposed camming ramp recesses 75 and 78. The axially outboard translation of the centrifugal apply member 70 forces the centrifugal apply balls 74 radially inwardly, as shown in FIG. 3. With the centrifugal apply balls 74 at their radially innermost position, the torque transfer device 20 will slip under virtually no load. The output shaft member 16 and the fan 31 is, therefore, not rotating. Any heat generated by the virtually unloaded torque transfer device 20 is dissipated by the lubricant in the drive 10 through the housing 11 and into the surrounding environment, typically water. It should be apparent that as the torque load on the fan decreases (as when the vehicle leaves the water), the fan 31 is again engaged by the spring apply mechanism 21 and the centrifugal apply mechanism 22, as previously described herein.

Figure 8:
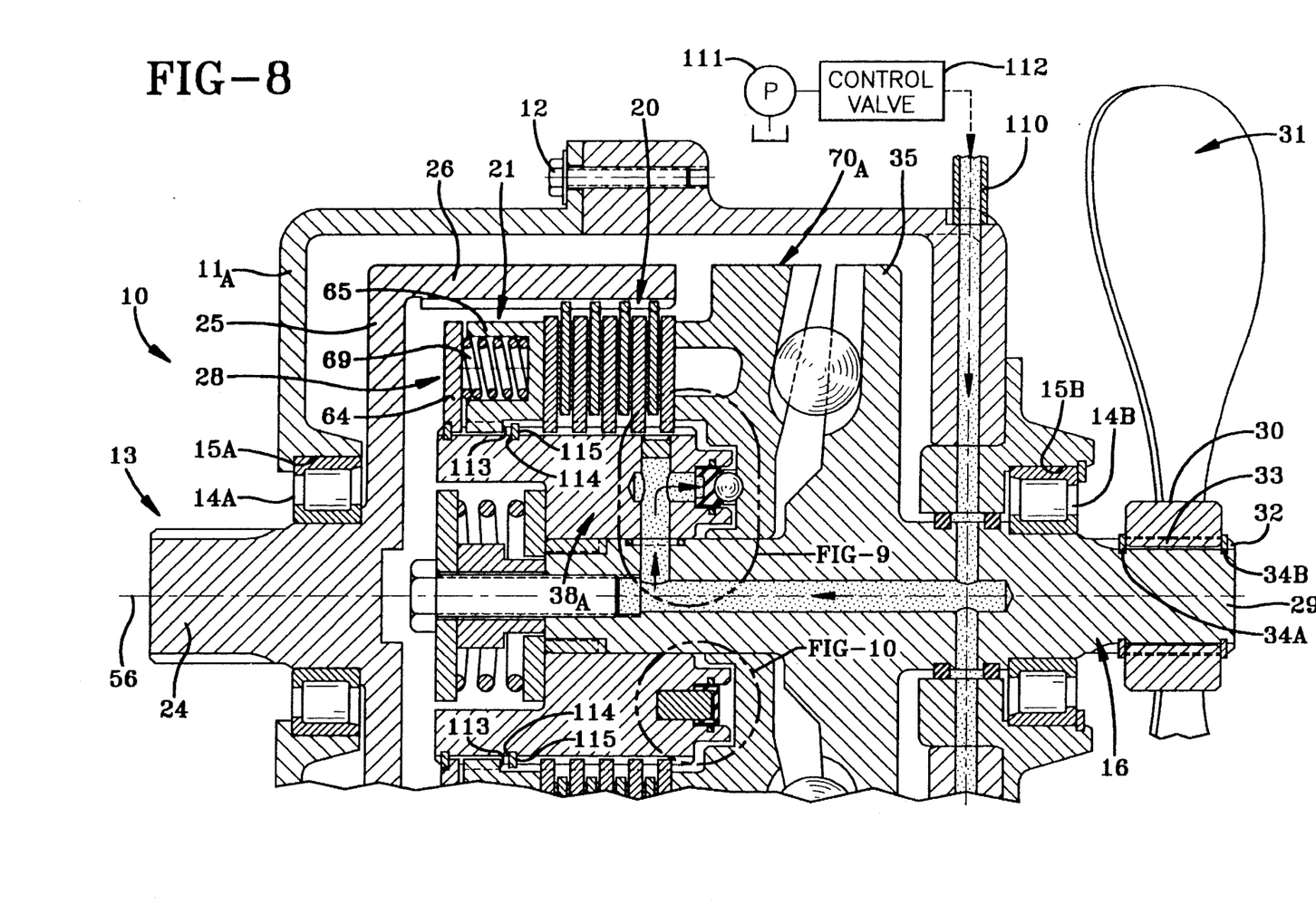
FIG. 8 is a view similar to FIG. 1 which depicts one means by which a hydraulically operated manual disconnect may be incorporated in a fan drive embodying the concepts of the present invention.
Figure 9:
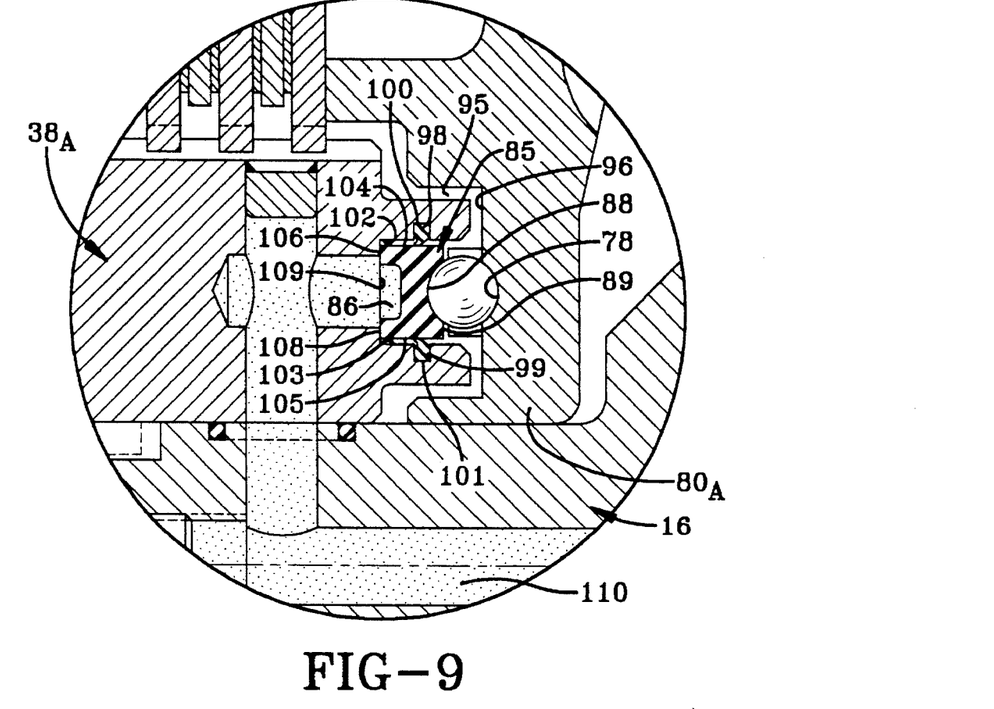
FIG. 9 is an enlarged area of FIG. 8, that area being outlined on FIG. 8 with a chain line and being designated "SEE FIG-9"
Figure 10:
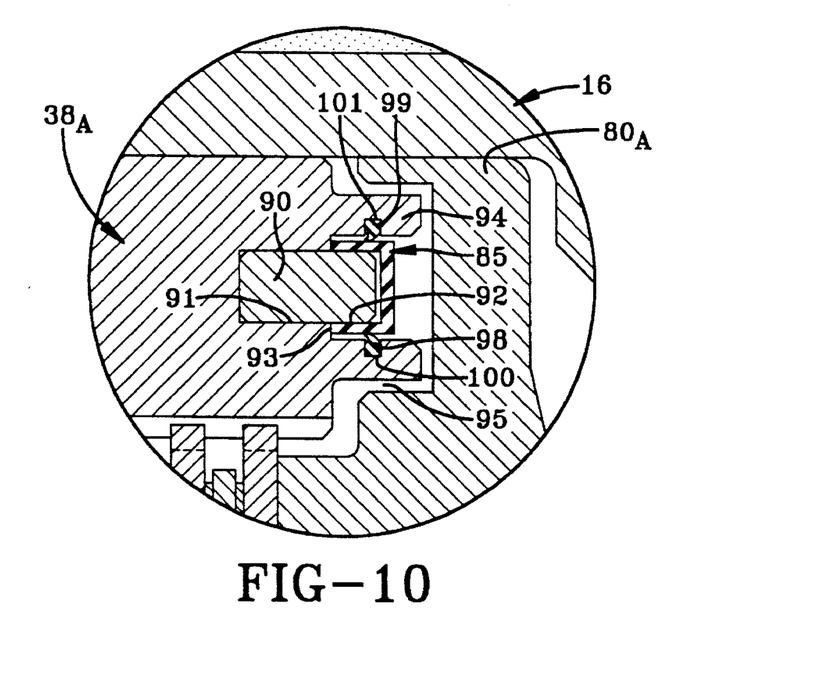
FIG. 10 is also an enlarged area of FIG. 8, that area being outlined on FIG. 8 with a chain line and being designated "SEE FIG-10".

In the alternative variation depicted in FIGS. 8 through 10, an annular ring piston 85 is received within an annular control chamber 86. Helically tapered camming recesses 88—having an identical configuration to the helical camming recesses 75 utilized in the previously described embodiment to engage the cam balls 81—are provided in the obverse face 89 of the annular ring piston 85. The annular ring piston 85 is free to be axially displaced but is restricted against rotation relative to the torque sensing collar $38_A$, as by one or more locating pins 90 that are slidably received for axial displacement within not only an equal number of cylindrical recesses 91 in the torque sensing collar $38_A$, but also within registered annular recesses 92 in the reverse face 93 of the annular ring piston 85, as best seen in FIG. 10.

The outboard end of the torque sensing collar $38_A$ may be necked to present an annular projection 94 that is adapted to be received within an opposed annular cavity 95 in the base portion $80_A$ of the centrifugal apply member $70_A$. The camming ramp recess 78 which opposes the camming ram recess 88 in the obverse face 89 of the annular ring piston 85 is provided in the base 96 of the annular cavity 95.

A pair of annular wipe rings 98 and 99 are received in annular slots 100 and 101 recessed in the respective side walls 102 and 103 of the annular cavity 95 to engage the respective side walls 104 and 105 of the annular ring piston 85. As such, the control chamber 86 is presented between the torque sensing collar $38_A$ and the annular ring piston 85.

When there is no pressure in the annular control chamber 86, the axial position of the annular ring piston 85 may be fixedly positioned by engagement of the ends 106 and 108 on the respective side walls 104 and 105 of the ring piston 85 against the base 109 of the annular control chamber 86. With the components so disposed, the alternative embodiment of the fan drive $10_A$ operates in exactly the same manner as the fan drive 10 previously described herein.

However, in the alternative fan drive $10_A$, the control chamber 86 may be selectively provided with pressurized hydraulic fluid by a passage 110 that connects a hydraulic pump 111 to the control chamber 86 through a manually operated control valve 112. When the control chamber 86 is thus selectively pressurized, the ring piston 85 is driven outboard—i.e.: to the right as viewed in FIGS. 8 and 9—to disengage the centrifugal apply member $70_A$ from the interleaved torque plates 59 and 62. The opposed reaction to this outboard displacement of the centrifugal apply member $70_A$ drives the torque sensing collar $38_A$ inboard—i.e.: to the left as viewed in FIGS. 8 and 9—a distance sufficient to engage a shoulder 113 on the spring piston 65 with an engaging surface 114 on a snap ring 115 carried on the torque sensing collar $38_A$. Engagement of the shoulder 113 by the snap ring 115 precludes outboard movement of the spring piston 65 in response to the biasing action of the spring 69. By thus maximizing the separation of the centrifugal apply member $70_A$ with respect to the spring piston 65, all compressive forces across the interleaved torque plates 59 and 62 are eliminated.

As such, the alternative embodiment of the fan drive $10_A$ operates automatically in response to high torque loading in the same manner as previously described fan drive 10, but in addition, both the spring piston 65 and the centrifugal apply member $70_A$ may be selectively released from the torque transfer device 20 whenever desired, and independently of either the speed at which the fan 31 is running or the magnitude of the torque loading encountered by the fan drive 10.

While only one preferred embodiment of the present invention and one alternative variation thereof, are disclosed, it is to be clearly understood that present concepts are susceptible to numerous changes by those skilled in the art. Therefore, the scope of the present invention is not to be limited to the details shown and described but is intended to include all changes and modifications which come within the scope of the appended claims.

Hence, the present invention not only teaches that a fan drive mechanism embodying the concepts of the present invention can be released in response to the application of a higher than desired torque loading, but also that the other objects of the invention can likewise be accomplished.

The embodiments of the invention in which an exclusive property or privilege is claimed are defined as follows:

1. A fan drive with high torque release comprising:
   an input shaft member;
   an output shaft member;
   torque transfer friction means operatively to connect said input shaft member with said output shaft member;
   spring apply means for engaging said torque transfer friction means;
   centrifugal apply means for engaging said torque transfer friction means in response to rotation of said shaft members; and
   means for releasing at least said centrifugal apply means under predetermined high torque conditions.

2. A fan drive, as set forth in claim 1, further comprising:
   means for releasing said spring apply means under predetermined high torque conditions.

3. A fan drive, as set forth in claim 1, wherein said torque transfer friction means comprises:
   a torque sensing collar surrounding said output shaft member;
   a plurality of torque transfer plates operatively secured to rotate with and, to a predetermined minimal extent, with respect to said torque sensing collar; and
   a plurality of torque transfer plates operatively secured to rotate with said input shaft member;
   said torque transfer plates that are operatively secured to said input shaft member being alternately interleaved with said torque transfer plates that are operatively secured to said torque sensing collar.

4. A fan drive, as set forth in claim 3, wherein said spring apply means comprises:
   an annular backing plate fixedly secured to said torque sensing collar;
   a spring apply member operatively secured to rotate with said torque sensing collar in relatively close proximity to said backing plate; and
   a plurality of spring members interposed between said annular backing plate and said spring apply member biasingly to urge said spring apply member against said interleaved torque transfer plates.

5. A fan drive, as set forth in claim 3, wherein said centrifugal apply means comprises:
   a shoulder portion on said output shaft member;
   said shoulder portion having a plurality of radially tapered ball receiving tracks;
   a centrifugal apply member having a plurality of radially tapered ball receiving tracks disposed in opposition to said radially tapered ball receiving tracks in said shoulder portion; and
   a centrifugal apply ball received in said opposed tracks such that centrifugal force generated by rotation of said output shaft member causes said balls to move radially outwardly along said opposed tracks, thereby forcing said centrifugal apply member to translate against said torque transfer plates in opposition to said spring apply means.

6. A fan drive, as set forth in claim 5, wherein said torque release means comprises:
   a plurality of first circumferentially oriented axially inclined camming ramp recesses on said torque sensing collar;
   a plurality of second circumferentially oriented axially inclined camming ramp recesses in said centrifugal apply member and disposed in offset opposition to said first camming ramp recesses;
   the axial inclination of said opposed camming ramp recesses being oppositely disposed;
   a plurality of cam balls received in said opposed camming ramp recesses; and
   means operatively to connect said torque sensing collar to rotate with, and modestly with respect to, said output shaft member.

7. A fan drive, as set forth in claim 6, further comprising:

hydraulic control means selectively to drive said cam balls against at least one of said opposed camming ramp recesses to effect translation of said centrifugal apply member away from said interleaved torque transfer plates.

8. A fan drive, as set forth in claim 7, further comprising:

a reaction surface to engage said interleaved torque plates to assure separation of said centrifugal apply member therefrom upon translation of said centrifugal apply member by said hydraulic means.

9. A fan drive, as set forth in claim 8, further comprising:

a second reaction surface presented from said torque sensing collar to engage said spring apply member selectively to disengage said interleaved torque transfer plates therefrom upon actuation of said hydraulic means.

10. A fan drive with a high torque release comprising:

an input shaft member;

an output shaft member;

a torque sensing collar surrounding said output shaft member and operatively attached to rotate with said output shaft member;

torque transfer means operatively to connect said input shaft member to said torque sensing collar for permitting a predetermined angular rotation therebetween;

opposed first and second apply members selectively to compress said torque transfer means;

a plurality of first circumferentially spaced circumferentially disposed and circumferentially offset axially inclined camming ramp recesses in said torque sensing collar;

a plurality of second circumferentially spaced circumferentially disposed and circumferentially offset axially inclined camming ramp recesses in said second apply member;

the axial inclination of said opposed camming ramp recesses being oppositely disposed; and a cam ball received in said opposed and offset camming ramp recesses.

11. A fan drive, as set forth in claim 10, wherein said first apply means comprises:

an annular backing plate fixedly secured to said torque sensing collar;

a spring apply member operatively secured to rotate with said torque sensing collar in relatively close proximity to said backing plate; and a plurality of spring members interposed between said annular backing plate and said spring apply member biasingly to urge said spring apply member against said torque transfer means.

12. A fan drive, as set forth in claim 10, wherein said second apply means comprises:

a shoulder portion on said output shaft member;

said shoulder portion having a plurality of radially tapered ball receiving tracks;

a centrifugal apply member having a plurality of radially tapered ball receiving tracks disposed in opposition to said radially tapered ball receiving tracks in said shoulder portion; and a centrifugal apply ball received in said opposed tracks such that the centrifugal force generated by rotation of said output shaft member causes said balls to move radially outwardly along said tapered tracks, thereby forcing said centrifugal apply member to translate against said torque transfer means in opposition to said spring apply means.

13. A fan drive, as set forth in claim 12, further comprising:

hydraulic control means selectively to drive said cam balls against at least one of said opposed camming ramp recesses to effect translation of said centrifugal apply member away from said torque transfer means.

14. A fan drive, as set forth in claim 13, further comprising:

a reaction surface to engage said interleaved torque plates to assure separation of said centrifugal apply member therefrom upon translation of said centrifugal apply member by said hydraulic means.

15. A fan drive, as set forth in claim 14, further comprising:

a second reaction surface presented from said torque sensing collar to engage said spring apply member selectively to disengage said interleaved torque transfer plates therefrom upon actuation of said hydraulic means.

* * * * *